US011895378B2

United States Patent
Chandra

(10) Patent No.: US 11,895,378 B2
(45) Date of Patent: Feb. 6, 2024

(54) METHOD AND SYSTEM FOR TARGETED BRAND CAMPAIGNING

(71) Applicant: EDITORJI TECHNOLOGIES PRIVATE LIMITED, New Delhi (IN)

(72) Inventor: Vikramaditya Chandra, Delhi (IN)

(73) Assignee: EDITORJI TECHNOLOGIES PRIVATE LIMITED, New Delhi (IN)

( * ) Notice: Subject to any disclaimer, the term of this patent is extended or adjusted under 35 U.S.C. 154(b) by 256 days.

(21) Appl. No.: 17/617,740

(22) PCT Filed: May 13, 2020

(86) PCT No.: PCT/IN2020/050434
§ 371 (c)(1),
(2) Date: Dec. 9, 2021

(87) PCT Pub. No.: WO2020/230164
PCT Pub. Date: Nov. 19, 2020

(65) Prior Publication Data
US 2022/0248109 A1    Aug. 4, 2022

(30) Foreign Application Priority Data

May 14, 2019  (IN) .............................. 201911019252

(51) Int. Cl.
*H04N 21/858*   (2011.01)
*G06Q 30/0251*  (2023.01)
(Continued)

(52) U.S. Cl.
CPC ..... *H04N 21/8586* (2013.01); *G06Q 30/0269* (2013.01); *G06Q 30/0277* (2013.01); *H04N 21/47815* (2013.01); *H04N 21/812* (2013.01)

(58) Field of Classification Search
CPC ......... H04N 21/8586; H04N 21/47815; H04N 21/812; G06Q 30/0269; G06Q 30/0277; G06Q 30/0251; G06Q 30/0241
See application file for complete search history.

(56) References Cited

U.S. PATENT DOCUMENTS

2012/0246218 A1 * 9/2012 Adimatyam ............ G06F 15/16
2013/0282483 A1  10/2013 Ruarte et al.
(Continued)

FOREIGN PATENT DOCUMENTS

CN   101739920 A   6/2010

OTHER PUBLICATIONS

Written Opinion of the International Searching Authority in related PCT/IN2020/050434; dated Sep. 4, 2020, 5 pages.
(Continued)

*Primary Examiner* — Anthony Bantamoi
(74) *Attorney, Agent, or Firm* — Dilworth IP, LLC

(57) ABSTRACT

Aspects of the invention are directed towards a system, platform and a method for targeted brand campaigning One or more embodiments of the invention describe the method comprising steps of determining one or more content hooks based on one or more preferences and behavior of a user while using the platform. The method also comprising steps of enabling the one or more content hooks with an executable link and directing the executable link to an advertisement playlist. The advertisement playlist comprises one or more descriptor videos and influencer videos curated for the user based on one or more parameters.

29 Claims, 8 Drawing Sheets

(51) Int. Cl.
*G06Q 30/0241* (2023.01)
*H04N 21/478* (2011.01)
*H04N 21/81* (2011.01)

(56) References Cited

U.S. PATENT DOCUMENTS

2015/0073896 A1   3/2015  Fisse
2015/0317794 A1*  11/2015 Lee ........................... G06T 7/00

OTHER PUBLICATIONS

International Search Report in related PCT/IN2020/050434; dated Sep. 4, 2020, 3 pages.

* cited by examiner

METHOD AND SYSTEM FOR TARGETED BRAND CAMPAIGNING

TECHNICAL FIELD OF INVENTION

The present invention generally relates to targeted brand campaigning. More particularly, the invention relates to a system and a method for delivering targeted advertisements to users on user terminals connected to the internet.

BACKGROUND OF THE INVENTION

Currently, video advertisements are largely seen on television channels and usually, these video advertisements are shown during breaks. Various advertisements pertaining to different products and services are displayed one after the other during a 5-10-minute break. However, during these breaks, many viewers switch channels or simply take a break. Further, the same advertisements are shown to each user and the advertisements are delivered to a user irrespective of user's preferences or location. Moreover, if there is any advertisement of interest, the viewer cannot interact with the advertisement of his/her choice. Thus, there is no direct call to action on the part of the viewer. There is no ability for the viewer to get more information about the product being advertised with a view to making a buying decision. While there are some TV channels dedicated exclusively to advertising and shopping where one can buy products of choice but they do have limitations such as holding on to telephone lines for long, not being able to get through or payment related issues that can affect one's shopping experience. Further, like television advertisements that come in ad breaks, the advertisements in these shopping channels are also not based on user's likes and preferences.

Now, when the internet is in widespread use, online shopping has seen a great surge, mainly due to the convenience factor. This is why video advertisements can now be seen streaming on digital media. The video advertisements on digital networks can sometimes be clicked upon and as such do have a call to action on the part of the viewer. However, the advertisements are usually inserted at the start of any video and they come inserted as single video, i.e., one particular video for a given product. As a consequence, such advertisements don't lend themselves to systematic branding campaigns by companies. There is usually a single advertisement for a product that is shown to all users, without specifically calling out any features or elements that could be of particular interest to an individual. At the same time, the viewers do not get complete information related to a product or service, nor can they easily get additional information to assist with a buying decision.

Various companies have started using "influencers" to promote their products, but the influencers are usually restricted to simple tweets with a hashtag, so on and so forth. A hashtag refers to a word or group of words preceded by a hash sign. It is a metadata tag which has become a dominant form of expression on social media and which enables a particular message to trend. However, it too has its disadvantages. Many a times the hashtags get ignored or even hijacked by trolls. Also, though hashtags have become very popular and are prevalent everywhere, they don't directly lead to videos or other content that can help a company sell its products. Another problem that exists in the existing art is that each advertisement is generally of 10-15 seconds duration during which it is not possible to make the audience acquainted with all the features of a concerned product and make an informed decision as to whether a given product is worth buying. Above all, there is no method in the existing art that effectively plays a series of videos that can specifically show information about a product or a service that will be directly relevant for a particular viewer.

In view of the afore-mentioned problems in the existing solutions, there is a need of an effective solution for enabling a product advertisers or the owners of the specific video content reach out to the right audience. Further, there is also need of a system and a method for enabling a user/viewer to get more and more information about a particular product by simply continuing to watch a playlist

OBJECTIVES OF THE INVENTION

A basic object of the present invention is to overcome the disadvantages and drawbacks of the known art.

It is an object of the present invention to provide a platform to advertisers, content creators and brand managers for uploading desired advertisements/video content that can be streamed to target audience or users.

It is another object of the present invention to allow advertisers and content providers to enable a user to interact with an e-commerce portal from a video.

Still another object of the present invention is to provide a method and system for generating a sequence of content hooks, descriptor videos influencer recordings and product advertisements according to one or more preferences and other factors.

It is also an object of the present invention to provide a method and system of providing the advertisement in form of an interactive advertisement playlist for the user.

It is yet another object of the present invention to provide a method and system for the user to share the advertisements.

It is another object of the present invention to provide a method and system for brand influencers to share product features, together with their own comments on a product or a service.

SUMMARY OF THE INVENTION

Various embodiments of the invention describe a method for targeted brand campaigning using a platform. The method comprises the steps of determining one or more content hooks based on one or more preferences and behavior of a user while using the platform. The method also comprises the steps of enabling the one or more content hooks with an executable link and directing the executable link to an advertisement playlist. The advertisement playlist comprises one or more descriptor videos and influencer videos curated for the user based on one or more parameters.

In an embodiment of the invention, the platform is configured to receive the one or more preferences from a user terminal of the user.

In a different embodiment of the invention, each of the one or more content hooks represent a video providing a factual news about a product or a service.

In another embodiment of the invention, the one or more parameters to determine the one or more descriptor videos and the influencer videos comprise a user profile, the preferences, user's location and the behavior while interacting with the content hooks, the descriptor videos and the influencer videos, a viewing history of the content hooks by the user, a viewing history of the descriptor videos by the user, a viewing history of the influencer videos by the user, a frequently visited category of the content hooks, a frequently visited category of the descriptor videos, a frequently visited category of the influencer videos, a history of products purchased by the user and/or user clicks on the content hooks, the descriptor videos and/or the influencer videos.

In yet another embodiment of the invention, the behavior of the user further comprises using one or more gestures while interacting with the one or more content hooks, the descriptor videos and/or the influencer videos on the user terminal.

In another embodiment of the invention, the one or more preferences received from the user comprise an age, a gender, a location, interest/s of the user, a weather season at a location of the user, an occasion at a location of the user, a popularity of a content hook, priority and interests of a content provider, a product of interest, a price range of the product, and/or a brand of the product.

In yet another embodiment of the invention, the platform determines the descriptor videos and the influencer videos based on the one or more parameters using artificial intelligence (AI)/machine learning (ML) techniques to create the advertisement playlist.

In still another embodiment of the invention, the platform determines the descriptor videos and the influencer videos on executing the executable link.

In an embodiment of the invention, the platform enables the one or more descriptor videos and the influencer videos determined by the platform are arranged differently for different users based on the one or more preferences and the behavior of each user or on a probability that the descriptor videos and the influencer videos are useful for the user as determined by the one or more parameters and AI/ML techniques.

In another embodiment of the invention, the platform transmits the advertisement playlist comprising the descriptor videos and the influencer videos to the user terminal when the user interacts with the executable link provided in the one or more content hooks.

In yet another embodiment of the invention, the one or more content hooks, the descriptor videos and the influencer videos are associated with at least one hash tag.

In a different embodiment of the invention, the one or more descriptor videos comprise a brief introduction of a product or a service and one or more features of the product or the service providing an ability to the user to make an informed buying decision.

In another embodiment of the invention, the one or more influencer videos comprise a review of a product or service and/or a description of the product or the service by an expert, wherein the expert records his/her opinion or a comment on the product or service.

In yet another embodiment of the invention, the each of the descriptor video and/or the influencer video direct the user to an interactive e-commerce portal or any other landing page for buying a product.

In a different embodiment of the invention, the platform enables a content provider to upload a descriptor video of a product and enables an influencer to upload an influencer video of the product using respective user credentials.

In an embodiment of the invention, the platform enables a content provider to select one or more hash tags from a content repository.

In another embodiment of the invention, the influencer is capable of sharing the influencer videos on different social media platforms.

In an embodiment of the invention, the content hooks and/or the advertisement playlist is determined based on the one or more preferences for a new user.

Various embodiments of the invention describe a platform for targeted brand campaigning. The platform comprises a determination unit configured to determine one or more content hooks based on one or more preferences and behavior of a user while using the platform. The platform further comprises an execution unit configured to enable the one or more content hooks with an executable link and direct the executable link to an advertisement playlist. Also, the advertisement playlist comprising one or more descriptor videos and influencer videos curated for the user based on one or more parameters.

In an embodiment of the invention, the platform is configured to receive the one or more preferences from a user terminal of the user.

In a different embodiment of the invention, each of the one or more content hooks represent a video providing a factual news about a product or a service.

In another embodiment of the invention, the one or more parameters to determine the one or more descriptor videos and the influencer videos comprise a user profile, the preferences, user's location and the behavior while interacting with the content hooks, the descriptor videos and the influencer videos, a viewing history of the content hooks by the user, a viewing history of the descriptor videos by the user, a viewing history of the influencer videos by the user, a frequently visited category of the content hooks, a frequently visited category of the descriptor videos, a frequently visited category of the influencer videos, a history of products purchased by the user and/or user clicks on the content hooks, the descriptor videos and/or the influencer videos.

In yet another embodiment of the invention, the behavior of the user further comprises using one or more gestures while interacting with the one or more content hooks, the descriptor videos and/or the influencer videos on the user terminal.

In another embodiment of the invention, the one or more preferences received from the user comprise an age, a gender, a location, interest/s of the user, a weather season at a location of the user, an occasion at a location of the user, a popularity of a content hook, priority and interests of a content provider, a product of interest, a price range of the product, and/or a brand of the product.

In yet another embodiment of the invention, the platform determines the descriptor videos and the influencer videos based on the one or more parameters using artificial intelligence (AI)/machine learning (ML) techniques to create the advertisement playlist.

In still another embodiment of the invention, the platform determines the descriptor videos and the influencer videos on executing the executable link.

In an embodiment of the invention, the platform enables the one or more descriptor videos and the influencer videos determined by the platform are arranged differently for different users based on the one or more preferences and the behavior of each user or on a probability that the descriptor videos and the influencer videos are useful for the user as determined by the one or more parameters and AI/ML techniques.

In another embodiment of the invention, the platform transmits the advertisement playlist comprising the descriptor videos and the influencer videos to the user terminal when the user interacts with the executable link provided in the one or more content hooks.

In yet another embodiment of the invention, the one or more content hooks, the descriptor videos and the influencer videos are associated with at least one hash tag.

In a different embodiment of the invention, the one or more descriptor videos comprise a brief introduction of a product or a service and one or more features of the product or the service providing an ability to the user to make an informed buying decision.

In another embodiment of the invention, the one or more influencer videos comprise a review of a product or service and description of the product or the service by an expert, wherein the expert records his/her opinion or a comment on the product or service.

In yet another embodiment of the invention, the each of the descriptor video and/or the influencer video direct the user to an interactive e-commerce portal or any other landing page for buying a product.

In a different embodiment of the invention, the platform enables a content provider to upload a descriptor video of a product and enables an influencer to upload an influencer video of the product using respective user credentials.

In an embodiment of the invention, the platform enables a content provider to select one or more hash tags from a content repository.

In another embodiment of the invention, the influencer is capable of sharing the influencer videos on different social media platforms.

In an embodiment of the invention, the content hooks and/or the advertisement playlist is determined based on the one or more preferences for a new user.

In various embodiment of the invention, a user terminal is disclosed. The user terminal comprises a transmitting unit and a receiver. The transmitting unit is configured to transmit a request comprising one or more user preferences to a platform. The platform is configured to determine one or more content hooks based on the one or more preferences and behavior of a user while using the platform. The platform is further configured to and enable the one or more content hooks with an executable link and direct the executable link to an advertisement playlist. The advertisement playlist comprises one or more descriptor videos and influencer videos curated for the user based on one or more parameters. The receiver is configured to receive the advertisement playlist from the platform.

In an embodiment of the invention, the one or more preferences received from the user comprise an age, a gender, a location, interest/s of the user, a weather season at a location of the user, an occasion at a location of the user, a popularity of a content hook, priority and interests of a content provider, a product of interest, a price range of the product, and/or a brand of the product.

In another embodiment of the invention, the platform determines the descriptor videos and the influencer videos based on the one or more parameters using artificial intelligence (AI)/machine learning (ML) techniques to create the advertisement playlist.

In yet another embodiment of the invention, the one or more content hooks, the descriptor videos and the influencer videos are associated with at least one hash tag.

In a different embodiment of the invention, the one or more descriptor videos and the influencer videos determined by the platform are arranged differently for different users based on the one or more preferences and the behavior of each user or on a probability that the descriptor videos and the influencer videos are useful for the user as determined by the one or more parameters and AI/ML techniques.

In another different embodiment of the invention, a computer readable medium is disclosed for targeted brand campaigning. The computer readable medium comprises one or more processors and a memory is coupled to the one or more processors, the memory stores instructions executed by the one or more processors. The one or more processors are configured to determine one or more content hooks based on one or more preferences and behavior of a user while using a platform. The one or more processors are further configured to enable the one or more content hooks with an executable link and direct the executable link to an advertisement playlist. The advertisement playlist comprising one or more descriptor videos and influencer videos curated for the user based on one or more parameters.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
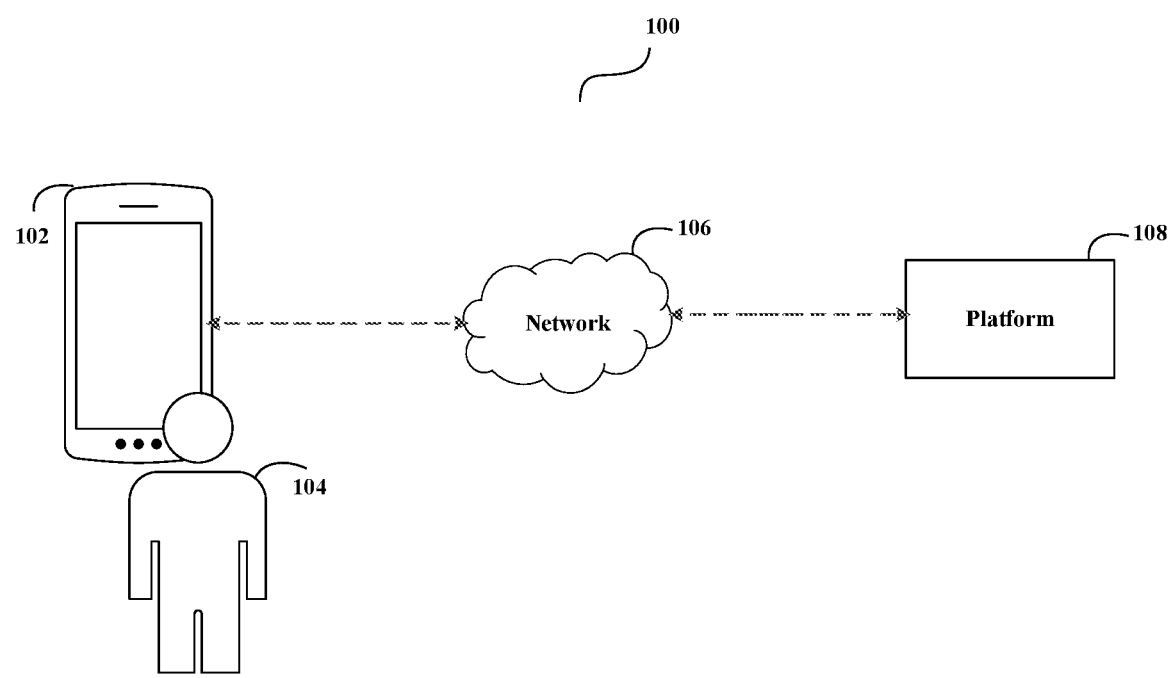
FIG. 1 depicts an exemplary system architecture according to an exemplary embodiment of the invention.

Described herein is a technology with a platform and a method for targeted brand campaigning using a platform. The platform may have a capability to receive one or more preferences of a user. Such preferences may be specified by the user at a user terminal and these preferences may be stored either on the platform or at the user terminal. Further, the platform may also be capable of monitoring behavior of the user i.e. all past or earlier interaction of the user with one or more content hooks, descriptor videos and/or influencer videos on the user terminal. The platform may further have the ability to assess a profile of the user by comparing to similar users across similar clusters and hence the platform may make a prediction about the preferences of the user who has not yet interacted extensively with the platform.

The essence of the present invention may be as follows: one or more content hooks may be widely circulated across multiple categories on the platform or elsewhere on the internet. Each content hook may comprise an executable link. When this executable link is clicked, the platform may create an advertisement playlist comprising multiple descriptor videos or influence videos on the basis of various parameters including the preferences, the parameters, the user profile, and AI/ML predictions on which the descriptor videos and/or the influencer videos may be of maximum relevance in assisting the user to take a buying decision. This advertisement playlist may then keep playing one descriptor video or influencer video after another until the user either decides to buy a product/service or exits the advertisement playlist. The pattern displayed by the user, in terms of the number of videos viewed, and which video the user either bought the product from or exited the advertisement playlist may be used to provide a valuable brand insight for a brand manager or an advertiser. Finally, there is a mechanism in the present invention to allow the brand to give access to a repository of the descriptor videos and the influencer videos to multiple influencers and also the general public to enable the sharing of the advertisement playlists on other various social media platforms.

For providing targeted brand campaigning, the user may raise a request to the platform for a video using the user terminal. In an exemplary embodiment, the video may be a news feed. Also, the user may use an application installed on the user terminal to raise the request. Alternatively, the user may use a website to raise such a request for the video. When the user terminal receives the request, the user terminal may transmit the request of the video to the platform through a network. On receiving the request, the platform may determine one or more interactive content hooks based on the preferences and the behavior of the user or on the basis of a predicted profile of the user. The platform may further enable each of the one or more interactive content hooks with an executable link. Such executable link may be inserted or enabled in each of the content hooks by a content provider (including an advertiser, a brand manager etc.). In an exemplary embodiment, the executable link may be present in the form of a descriptor or executable button (such as "Show me more about this product", "Tell me more", "Click here for more information") in the content hooks. In an exemplary alternative embodiment, the executable link may be inserted or placed in the content hooks as a hyperlink. The content hooks (along with the executable link) may be placed in the requested video at one or more interval and may be transmitted to the user terminal through the network by a platform. When the user terminal receives the video with the one or more content hook, the user may view/watch the video and the one or more content hooks. While viewing the one or more content hooks, the user may also interact/click on the executable link and then, the platform may then direct the executable link to an advertisement playlist. The advertisement playlist may comprise one or more descriptor videos and influencer videos curated for the user based on one or more parameters.

In an exemplary embodiment of the present invention, the one or more preferences may be specified by the user at the time of raising the request for the video to the platform. In another exemplary embodiment of the present invention, the one or more preferences may be specified by the user any time before raising such request and these preferences may be stored at the platform or at the user terminal. As used herein, the one or more preferences received from the user at the user terminal may comprise an age, a gender, a location, interest/s of the user, a weather season at a location of the user, an occasion at a location of the user, a popularity of a content hook, priority and interests of a content provider, a product of interest, a price range of the product, and/or a brand of the product. Further, the present invention also encompasses the platform and/or the user terminal to automatically identify the one or more preferences instead of manually receiving these preferences from the user. For an example, the location of the user may be automatically identified by a global positioning system (GPS) of the user terminal and shared with the platform. Similarly, a weather/season at the location of the user and an occasion at a location of the user may further be automatically identified using the location of the user. Considering an example, if the location of the user is identified as "New Delhi" and using current month information say "October", the weather (Autumn season with temperature 23 to 35 degree Celsius) and the occasion ("Dussehra festival") at the location of the user may be further identified. Based on such preferences, the content hooks may be determined.

Moreover, the behavior of the user may be monitored based on past or earlier interactions of the user with the content hooks, the descriptor videos and the influencer videos. Also, the behavior of the user further comprises using one or more gestures while interacting with the one or more content hooks, the descriptor videos and/or the influencer videos on the user terminal. The interaction of the user with the content hooks, the descriptor videos and the influencer videos may comprise a viewing history of the content hooks by the user, a viewing history of the descriptor videos by the user, a viewing history of the influencer videos by the user, a frequently visited category of the content hooks, a frequently visited category of the descriptor videos, a frequently visited category of the influencer videos, a history of products purchased by the user and/or any kind of user clicks on the content hooks, the descriptor videos and/or the influencer videos. Such behavior of the user may be used by the platform to filter appropriate content hooks for the user in the requested video. In addition, this behavior of the user may be automatically monitored and identified based on the activity or interaction of the user with the content hooks, the descriptor videos and/or the influencer videos from the platform. For example, the viewing history of the content hooks, the descriptor videos and/or the influencer videos by the user in last three months may be identified which may be used in determining relevant content hooks for the user. In addition, as an example the trending or popular content hooks may be assembled and placed in the requested video for the user.

Each and every interaction of the user with existing and already visited content hooks, the descriptor videos and/or the influencer videos may be monitored by the platform. For an instance, the content hooks, the descriptor videos and/or the influencer videos which the user has visited in last one month. In another example, the content hooks, the descriptor videos and/or the influencer videos which the user has visited the most in the three months or products bought through the content hooks, the descriptor videos and/or the influencer videos etc. may be monitored by the platform. These kinds of user interaction becomes basis for determining relevant content hooks for the user. The usage of the preferences and the user behavior for determining the content hooks would deliver different content hooks to different users. In an exemplary embodiment, the already visited content hooks, the descriptor videos and the influencer videos may denote the user interest in content hooks, the descriptor videos and the influencer videos. Further, an updated version of the already visited or already existing content hook may be placed in the requested video.

In an exemplary embodiment of the present invention, the preferences and the behavior of the user, together with deduction about the user on the basis of other parameters, may be combined to form a user profile. The user profile, the preferences and the behavior of the user may be considered as one or more parameters to create and compile an advertisement playlist by the platform. In an exemplary embodiment, the advertisement playlist may be created by the platform when the user clicks on the executable link. In another exemplary embodiment, the advertisement playlist may be created when a content provider (including the advertiser and/or the brand managers) as well as an influencer uploads the descriptor videos and the influencer videos on the platform. The advertisement playlist may comprise the one or more descriptor videos and the one or more influencer videos. The platform encompasses to determine and create the content hooks and the advertisement playlist based on the parameters comprising the user behavior and the preferences. Such parameters would help in providing a customized and curated experience to the user by providing targeted advertisement playlist to the user and different advertisement playlist for each user. For this, the platform may determine and create the advertisement playlist by analysis of the parameters (comprising the preferences and the behavior of the user) which resulted in making a user's choice to visit or view descriptor videos and the influencer videos for purchasing the product or the service. The order of streaming the descriptor videos and the influencer videos after the executable link in the content hooks is clicked, is determined by AI/ML techniques. Every user is shown descriptor videos and/or the influencer videos in the order to maximize the information that will be helpful to them in taking a buying decision.

The analysis of the one or more parameters (comprising the preferences and the behavior) for determining relevant content hooks, the descriptor videos and the influencer videos to create the advertisement playlist may be performed by employing several artificial intelligence (AI) or machine learning (ML) techniques. These AL/ML techniques may deep-dive in the one or more parameters so that selections or choices made by the user or by general public in the past can be understood for providing better experience to the user by delivering targeted content hooks and the advertisement playlist. As an example, if an analysis of the one or more parameters of a particular user infers that this user has keen interest in cars, then the content hooks and the advertisement playlist related to cars can be determined as relevant for this user. In another example, if an analysis of the one or more parameters of a particular user infers that a user has always skipped the content hooks and the advertisement playlist related to televisions, then the content hooks and the advertisement playlist related to televisions can be determined as irrelevant for this user and would not be shown to that user. In other words, skipping a particular content hooks and/or certain descriptor videos and the influencer videos in an advertisement playlist by a particular user would also be monitored by the platform for determining relevant content hooks and advertisement playlist/s. It is important to note that the platform doesn't necessarily require any individual knowledge about the user or his/her preferences. The platform has the ability to assess these preferences on the basis of predictions made on the basis of the preferences and behavior of the broader public, together with deductions about the profile of this user using the AI/ML techniques.

Similarly, the platform enables different users to receive any target brand advertisement differently. For example, one user may receive product based on the technical features of a product. Another user may receive videos on how the product looks, while a third user could get videos on whether a celebrity has used this product. The choice of which descriptor videos and/or influencer videos may be shown, along with the order in which they are shown will be determined by the techniques laid out in this invention. In one example, the platform may be able to determine content hooks and/or the descriptor/influencer videos based on the user behavior whether the selection of a content hook in the video was based on the features of the products or the user has viewed descriptor video with an advertisement by a celebrity (say three times). In another example, the platform is able to identify the user's behavior that the influencer video from a technical expert was viewed completely (say two times). These instances provides knowledge to the platform regarding user's behavior. However, the platform may also able to determine the specific descriptor videos or the influencer videos that need to be shown along with the order in which they are to be shown, by deducing a probability of how useful and appealing they will be to an individual user by, for example, evaluating how others in similar demographic or economic profile have reacted.

The present invention also encompasses to determine the one or more content hooks and/or the advertisement playlist for a new user. Such determination would be based on the one or more preferences and other similar users only as initially there will be no behavior availability for the new user. Over the period of time, the behavior of that user may be monitored and built based on his/her interaction with other content hooks and/or advertisement playlist. Then, the one or more content hooks and/or the advertisement playlist may be determined for that new user based on the preferences as well as the behavior of that user. Moreover, the platform may also determine a list of the descriptor videos and the influencer videos constituting the advertisement playlist based on behavior of general public, an individual clusters of users and on multiple parameters that may be used to determine which specific descriptor videos would be optimal for the new user even if very little is known about that individual user. Multiple algorithms and AI/ML techniques may be used for this purpose.

In another embodiment of the present invention, the platform may also determine the one or more content hooks and/or the advertisement playlist based on one or more constraints defined by the content provider (including the advertiser or the brand manager). This may additionally help in delivering the targeted content hooks and the advertisement playlist to the user. As used herein, the one or more constraints defined by the content provider comprises an area of a service, timing, a location of the user. For an example, if a particular product is not available for purchasing in a location of the user or is legally prohibited in that location, then content hook/s and/or the advertisement playlist related to that product is not determined as relevant content hook and/or a relevant advertisement playlist for that user. Another example can be a particular product is not available to be delivered in an area of a service of the user then content hook/s and/or the advertisement playlist related to such product is not determined as relevant content hook/s. In various embodiments of the present invention, the preferences and the one or more constraints defined by the content provider are input using a graphic slider and/or bar and/or numeric digits and by using one or more gestures on the user terminal.

In a different embodiment of the present invention, each of the content hooks may represent a video providing a factual news about a product or a service and may be present in between a streaming video. These content hooks are interactive in nature and comprise the executable link that would direct the users to the advertisement playlist when the user clicks on the executable link or interacts with the content hooks. An example of a content hook may be "Apple has launched a new iPhone in the market" with an executable link of the advertisement playlist, where the advertisement playlist will show one or more descriptor videos and the influencer videos of the Apple iPhone. Another example of the content hook may be "Kia Motors has launched a new car" with an executable link of the advertisement playlist, where the advertisement playlist will show one or more descriptor videos and the influencer videos of the Kia's New launched car.

The content hooks may be inserted in a storage space (known as "buckets" herein) on the platform. The content hooks may be filled in the buckets associated with the requested video based on the preferences and the behavior of the user as discussed above. Also, the placement of the content hooks in the video may be decided by the platform based on a predefined criteria. Some factors such as length/duration of the video, a duration of a content hook etc. may also be considered while placing the content hooks in the video. A single video may contain only one content hook or may contain two or more than two content hooks depending upon the duration of the video as well as duration of a content hook to be placed in the video. The placement of content hook in the video content or news feed in the form of buckets is explained in greater detail in PCT Application no: PCT/IN2019/050021 Titled: "Method and System for Customized Content" which is incorporated herein by reference. The duration of each content hook in the video may be same or different. Such as a content hook of 7 seconds may be placed in a first segment of the video, another content hook of 12 seconds may also be placed in a second segment half of the video. Similarly, yet another content hook may be placed in third segment of the video and so on. The frequency of the placement of the content hook in the video may depend on the duration of the requested video, preferences, behavior with the content hooks, and various other factors.

In another embodiment of the present invention, the one or more descriptor videos in the advertisement playlist may comprise a brief introduction of a product or a service and one or more features of the product or the service providing an ability to the user to make an informed buying decision. Further, the one or more influencer videos in the advertisement playlist may comprise a review of a product or service and a description of the product or the service by an expert. Also, the expert records his/her opinion or comment/s on the product or service. Each of the one or more descriptor videos and one or more influencer videos may also comprise a link to the e-commerce portal for purchasing the particular product or the service. For an example, a link of Apple website may be provided in a descriptor video and an influencer video from where the user may but the iPhone. Similarly, a link of Kia Motors website may be provided in a descriptor video and an influencer video from where the user may but the car. And, in case the user is not interested in viewing the advertisement playlist, then the user may use a button provided in the advertisement playlist that would take the user back to the content hook. Also, the advertisement playlist may either drive buying decisions or may provide insights to brand marketeer about the features of the product that are working well or not with users.

When the user interacts with any of the link provided in the each of the descriptor videos and influencers videos, the user would be ultimately directed to the interactive e-commerce portal or any other landing page chosen by the content provider or the advertiser/brand manager where transactions could be made to buy the product/service. The advertisement playlist may comprise a single video or a plurality of videos. The videos in the one or more advertisement playlist may be interactive to enable the user/viewer to view a video playlist. In one embodiment of the present invention, the descriptor videos may be in the form of nested descriptor videos or influencer videos. The system uses the AI/ML techniques and other techniques to decide a subsequent descriptor video and influencer video which may be played with no further action on the part of the user. The descriptor videos along with influencer videos may be played one after the other providing further description of the product to the user. As per the instructions of the advertisers, the brand managers, or the content providers, the hashtag can be associated with the one or more content hooks, the descriptor videos along with influencer videos to enable the playlists trend on social media. The descriptor videos, the influencer videos, and the hash tags may be linked to an interactive e-commerce portal or to any other suitable landing site including a company website or dealer contact details as explained above.

In addition, the platform enables the user to customize a time duration for which the user wishes to view the one or more interactive content hooks, the descriptor videos and/or the influencer videos. Thus, the size of each bucket for the content hook the descriptor videos and/or the influencer videos may be defined in terms of the preferences. The total number of advertisement breaks in between the video can also be decided by the user or may be determined automatically by the platform. For example, the user may limit the duration to 30 seconds and number of breaks to two. The platform may then show content hooks for 30 seconds in each of the two breaks. The platform based on various parameters may choose the content hooks to be shown. In the above example, the system can choose to show three content hooks of 10 seconds each or 2 content hooks of 15 seconds each. The platform may decide to show three content hooks in one break and two content hooks in the other. Any number of buckets including one or more content hooks can be incorporated at predefined intervals and are completely within the scope of the invention.

Moreover, the platform may enable content providers (the advertisers or the brand managers) to create an account with login user credentials on the platform that delivers targeted content hooks, the descriptor videos and the influencer videos to the user/s. Using the account, the platform enables the content providers (the advertisers or the brand managers) to upload one or more descriptor videos relating to the product or the service which a seller (or advertiser) wishes to sell. In an exemplary embodiment, the descriptor videos may provide a brief introduction of a product or a service. Also, the descriptor videos may provide an explanation of one or more features of the product or the service. The descriptor videos may be marketing videos that are designed to showcase the product and associated worth to buy the product. The descriptor videos may be preferably designed around complementary sales points for the users. As an example, a new gadget could have a descriptor video around "unboxing" or "user experience" and other marketing collaterals. Similarly, a boutique owner can have a descriptor video around "recent trends in fashion" or "designs" or "fabrics". Similarly, a service provider can have the descriptor videos based on "service terms and conditions", "quality of service", "policies", "payment schedules" and the like. These descriptor videos would help a viewer to know about the product or the service.

Further, the platform may enable one or more influencers to upload one or more influencer videos on the platform using its own account with its respective login credentials. Further, the influencers are enabled by the platform to see a list of all the descriptor videos that the content provider or the advertiser has identified. The influencer has the ability to add any descriptor video that they want to a fresh advertisement playlist. The platform enables the influencer to open a camera and record a video by tapping on a button which can be treated as an influencer video. In an exemplary embodiment, the one or more influencers may be a celebrity or any such person having a large number of followers on that particular platform. In another exemplary embodiment, the one or more influencers may be a technical expert who can review the product or the service in question. The influencers videos may be individual short videos created by individuals with strong social media presence. The influencers videos may comprise an opinion of an influencer on the product, or may be a review of the product or describing the product or the service by an expert. For an example, a tech-savvy person may give his expert opinion and views on recently launched gadgets like a new smartphone. The person may discuss the pros and cons of the product according to his first-hand experience and give ratings to the product. The person may even compare a product with other related products in the market. Similarly, an influencer can speak about services offered by any hospitality service based on personal experience. The influencers videos so created may be available on the platform to be inserted in video/s for the audience. In this way, there would be an impact on the influencers for marketing purposes.

Furthermore, the platform also enable the content providers or advertisers to select one or more hash tags from a content repository which may comprise a corpus of different hash tags. Such hash tags may be associated with one or more content hooks, the descriptor videos and/or the influencer videos. For an example, for a product say "HP Laptop", hash tags such as #Laptop, #HP, #HewlettPackard, #Notebook, #HighSpeedLaptop etc. may be selected by the content provider. Such hash tags may be associated with the one or more content hooks, the descriptor videos and/or influencers videos by the content provider or the influencer, respectively.

According to another embodiment of the invention, the content providers (including the advertisers or the brand managers) may create their own branding playlists by logging into their respective account created on the platform and uploading the descriptor videos followed by selection of an e-commerce portal and a hashtag. Similarly, the influencers who may then upload their opinions or comment/s in form of influencer videos. In another embodiment of the invention, the content provider may enable the influencers to upload video content comprising their opinions through a unique web link and the like. The influencers and/or the content providers may also share or publish these descriptor videos and/or the influencer videos on different social media platforms such as Facebook™, Twitter™, Whatsapp™, YouTube™, LinkedIn™, Instagram™ and/or the like. The platform enables the influencer to include the one or more descriptor videos uploaded by the content provider in a playlist and publish the list on desired portals. Similarly, the content provider also has an option of including the influencer videos with the descriptor videos and may create a customized playlist that may be shared further by publishing on different portals.

In yet another embodiment of the present invention, the platform provides a user interface that is easy to navigate and enables the user to skip a particular content hook, the descriptor videos and/or the influencer videos by performing one or more gestures on the user terminal. This ensures that the content hooks, the descriptor videos and the influencer videos are not forced upon the user and user is able to exercise his/her own choice in deciding which content hooks, the descriptor videos and/or the influencer videos are to be viewed. The one or more gestures performed by the user on the user terminal may also correspond to the user behavior and be used for determining relevant content hooks, the descriptor videos and/or the influencer videos for the user. For an example, if a particular user repeatedly skips content hooks related to a mobile phone of a specific brand then content hooks, the descriptor videos and/or the influencer videos related to a mobile phone of the same brand shall not be determined as relevant content hooks, the descriptor videos and/or the influencer videos or the user in future. As used herein, the one or more gestures may comprise, but is not limited to, clicking, tapping, swiping, scrolling or zooming on an interface of the user terminal.

FIG. 1 depicts an exemplary system architecture 100 according to an exemplary embodiment of the invention. As depicted in FIG. 1, a user 104 may use a user terminal 102 to raise a request for a video to a platform 108. The user 104 may also input one or more preferences at the user terminal 102. The user terminal may then receive and transmit the request for video as well as the preferences to the platform 108 through a network 106. The platform 108 may receive the request for video as well as the preferences from the user terminal 102 of the user. The platform 108 may further determine one or more interactive content hooks based on the one or more preferences of the user 104 and behavior of the user. The behavior of the user may be monitored by the platform 108 which comprise past or earlier interaction of the user 104 with other content hooks, other descriptor videos and/or other influencer videos. Also, the determination of the one or more interactive content hooks may be performed using artificial intelligence (AI)/machine learning (ML) techniques as discussed above. The one or more interactive content hooks is also determined using the technology as described in Application Number: PCT/IN2019/050021 Titled: "Method and System for Customized Content" which is incorporated herein by reference.

In an embodiment of the invention, the one or more preferences and the user behavior may already be stored at the platform 108 and/or the user terminal 102. Further, these preferences and the user behavior may either be automatically identified or manually specified by the user 104 as described above. In addition, the platform 108 may also determine one or more descriptor videos and/or influencer videos curated for the user 104 based on one or more parameters (comprising the preferences and the behavior of the user 104) using artificial intelligence (AI)/machine learning (ML) techniques as explained above. The platform 108 may then compile the descriptor videos and/or the influencer videos to create an advertisement playlist. Further, an executable link for the created advertisement playlist may be enabled (i.e. placed/inserted) at the content hook by the platform 108.

When the platform determines the interactive content hooks and the advertisement playlist based on the preferences and the behavior of the user 104, the platform 108 may place the one or more interactive content hooks having the executable link in the requested video at one or more intervals. The placement of the content hooks at different intervals may be decided by the platform 108 itself or based on the preferences. Accordingly, the platform 108 may transmit the requested video along with the content hook and the executable link for the advertisement playlist to the user terminal 102 through the network 106.

When the video with the content hooks is received by the user terminal 102, the video with the content hooks may be automatically played or when the user 104 provides an input on the user terminal 102 for example, tapping a "play" button. After or while viewing the content hooks, the user 104 may interact with the executable link provided in the content hooks by clicking on the executable link. The interaction of the user 104 with the executable link may be done by performing any kind of gesture on the content hooks. When the user 104 interacts with the executable link, the platform 108 may then directing the executable link to the advertisement playlist having the descriptor videos and/or the influencer videos. Accordingly, the platform 108 may transmit the advertisement playlist comprising the descriptor videos and the influencer videos to the user terminal 102 when the user 104 interacts with the executable link provided in the one or more content hooks. Then, the user 104 may view the descriptor videos and/or the influencer videos. In this way, the one or more descriptor videos and the influencer videos determined by the platform 108 may be arranged differently for different users based on the preferences and the behavior of each user. Also, the one or more descriptor videos and the influencer videos determined by the platform 108 may be arranged differently for different users based on a probability that these videos will be useful for the user 104 as determined by various parameters, algorithms and the AI/ML techniques.

Each of the descriptor videos and the influencer videos may have a link that is provided by a content provider (including an advertiser or a brand manager) of a product or a service. When the user 104 clicks on that link provided in the descriptor videos and/or the influencer videos, the platform may further direct the user 104 to a landing webpage or a portal where the user 104 may buy or purchase the product or the service.

As used herein, the user terminal 102 may refer to a hand-held device such as a smartphone with internet connectivity. The internet connectivity may be provided to the user terminal through a network. The user terminal may include, but is not limited to, a desktop, a mobile device, a laptop, a smart phone, a tablet, a personal digital assistance, a wearable device, or any such user terminal that is obvious to a person skilled in the art.

As used herein, the platform has processing capabilities as disclosed further in the specification. The platform may be a server, a cloud storage, a remote database, or any such storage known in the art.

As used herein, the platform 108 has processing capabilities as disclosed further in the specification. The platform may be a server, a cloud storage, a remote database, or any such storage known in the art.

As used herein, the network 106 may refer to a wired network, a mesh network, a cellular network (such as Global System for Mobile (GSM) network, a Long-Term Evolution (LTE) network, a code-division multiple access (CDMA) network, a narrow-band internet of thing (NB-IoT) technique or category M1 technique)), a short-range network (a bluetooth network, a WiFi network, or a ZigBee network) or any such network/technique that is known in the art.

Figure 2:
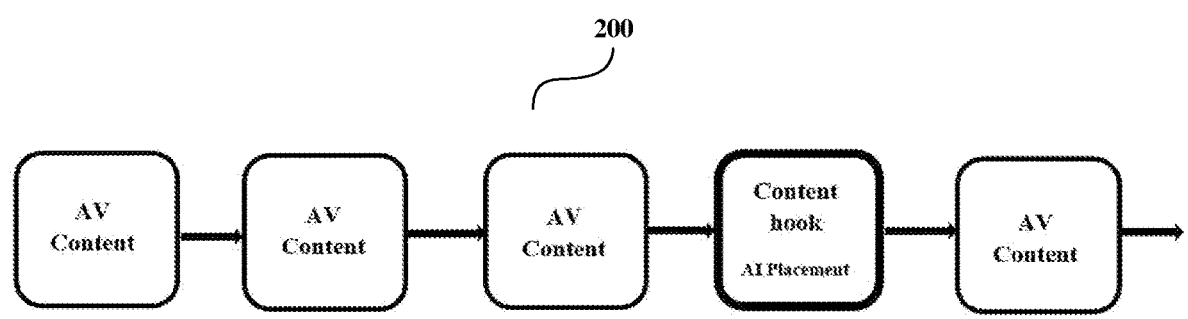
FIG. 2 depicts an exemplary playlist having varied AV (audio video) content with the CH (content hook)/AV hooks inserted in between, according to an exemplary embodiment of the invention.

FIG. 2 depicts an exemplary playlist 200 including audio visual (AV) content streamed to a user 104. The platform 108 may determine to insert one or more buckets comprising interactive content hooks in the audio-visual content. The content hooks may be in the form of AV hooks that are placed using the platform 108. The placement of the content hooks may be determined by the platform 108 based on the preferences and the other parameters as discussed above using the artificial intelligence (AI)/machine learning (ML) techniques. Further, the content hooks may be interactive and may comprise an executable link for advertisement playlist having descriptor videos and the influencer videos.

Figure 3:
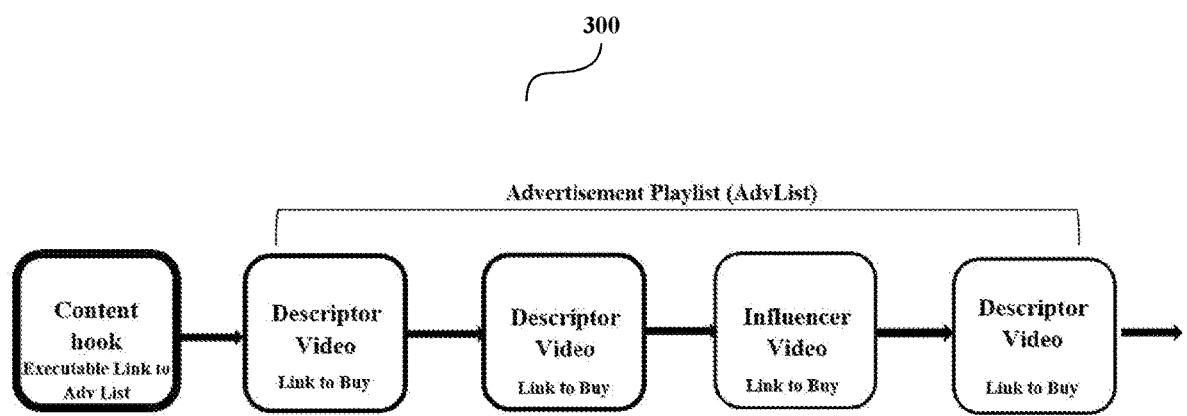
FIG. 3 depicts an exemplary branding playlist according to an exemplary embodiment of the invention.

FIG. 3 depicts an exemplary content hook 300 followed by the descriptor videos and the influencer videos. As explained above, when the user 104 interacts with the executable link provided on a content hook, the platform 108 may determine relevant descriptor video/s and influencer video/s based on the parameters using the AI/ML techniques. Also, the platform 108 then generates an advertisement list comprising the relevant descriptor video/s and influencer video/s. When the user 104 interacts with the executable link provided on the content hook, the advertisement list comprising the relevant descriptor video/s and influencer video/s may be provided to the user 104. While a descriptor video is a video showing the technical features and advantages of a product in detail and an influencer video features an influential personality giving his review of the product as explained above. The descriptor videos and the influencer videos may assist the user 104 in determining the utility of the product for them. The AV hook/content hook and the associated descriptor and influencer videos can provide the user 104 with a choice to ultimately buy the product therein within the video.

Figure 4:
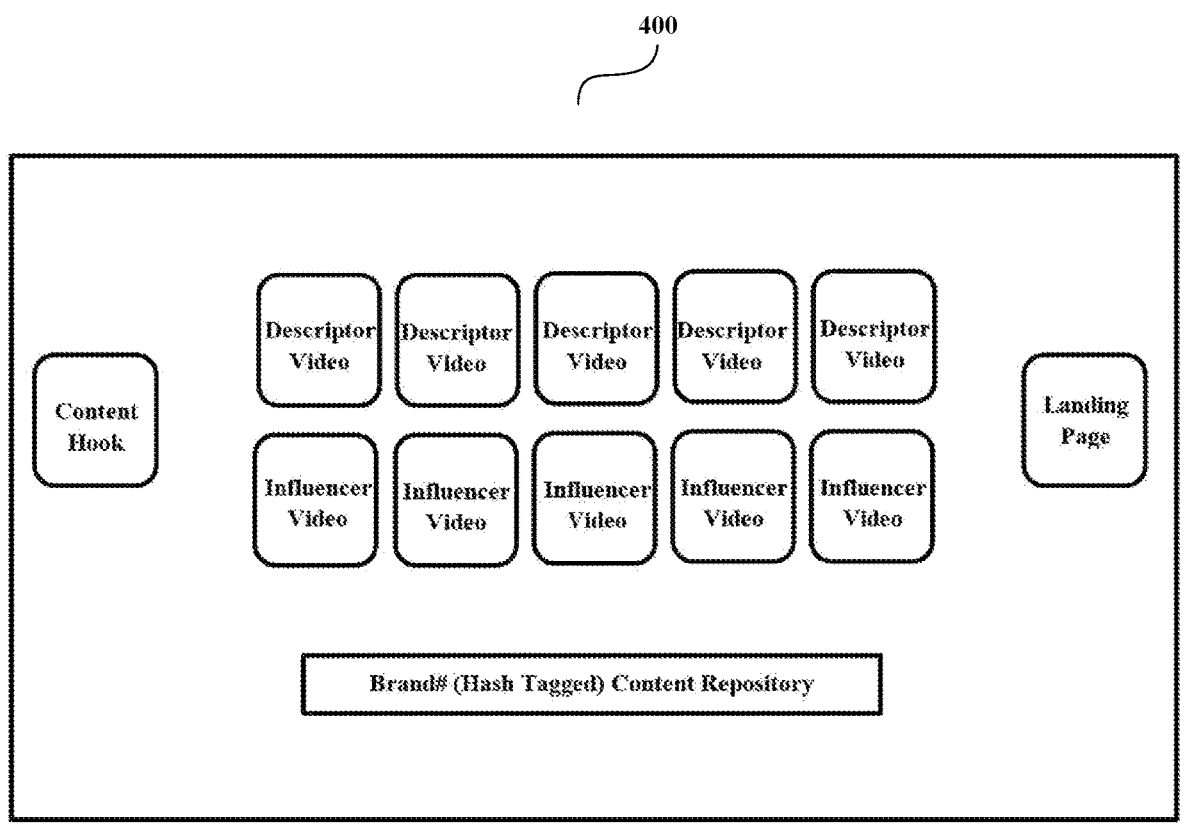
FIG. 4 depicts an exemplary brand video account according to an exemplary embodiment of the invention.

FIG. 4 depicts an exemplary configuration of a brand video account 400 of a content provider. The content provider may purchase an account on a login-based platform 108 that entitles the content provider (including advertisers and brand managers) to some storage space on the platform 108. The content provider creates descriptor videos associated with a particular content hook, featuring the technical attributes of the products that are to be advertised and uploads the videos. The content provider also selects an e-commerce portal and a hashtag. The content hook when clicked by the user 104 leads to a series of descriptor videos and influencer videos leading to the chosen e-commerce portal where the user 104 can select to purchase the product. FIG. 4 further discloses a hash tagged content repository for brand specific content stored therein from where the content provider may select hash tags for tagging the content hooks, the descriptor videos and the influencer videos.

Figure 5:
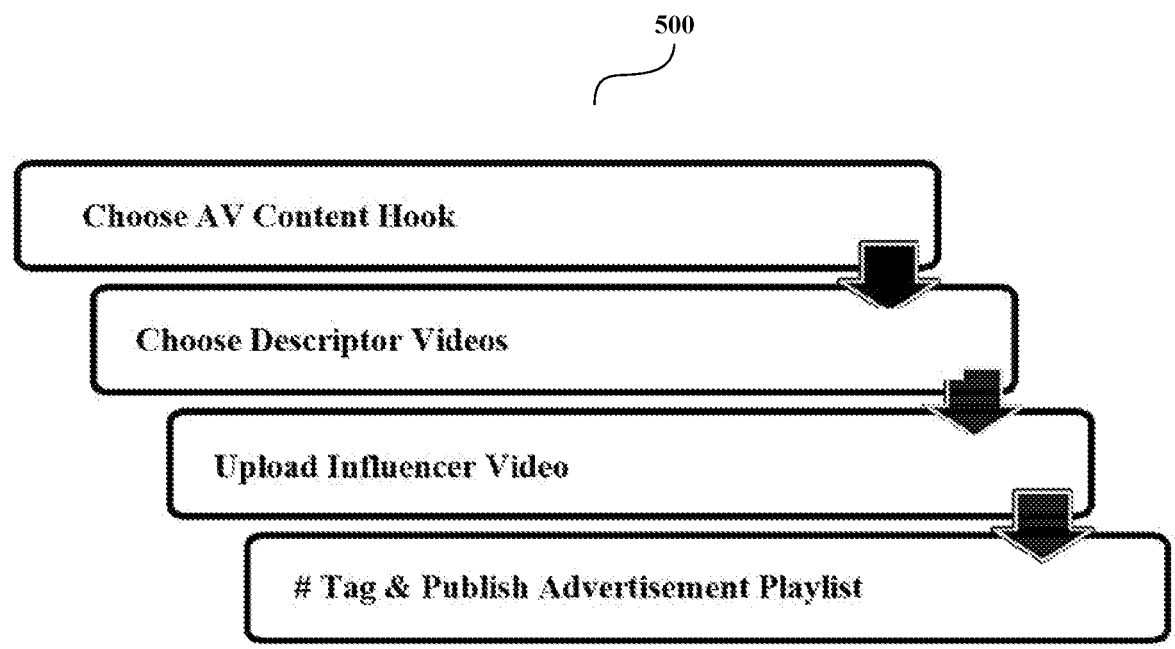
FIG. 5 depicts influencer instruction set according to an exemplary embodiment of the invention.

FIG. 5 depicts an exemplary influencer instruction set 500 that the brand owners can provide to any influencer. The influencer is given access to the brand account, wherein the person may select a content hook followed by selection of one or more descriptor videos. The influencer may then record their opinion/comments or product review and upload the videos that are referred to as influencer videos. The customized branding playlist can then be hash tagged and published on social media or any other platform. The various attributes of the descriptor videos, influencer videos, and the hash tags related to a brand are managed by the content provider on the platform 108. For this, the content provider may have login credentials associated therewith.

Figure 6:
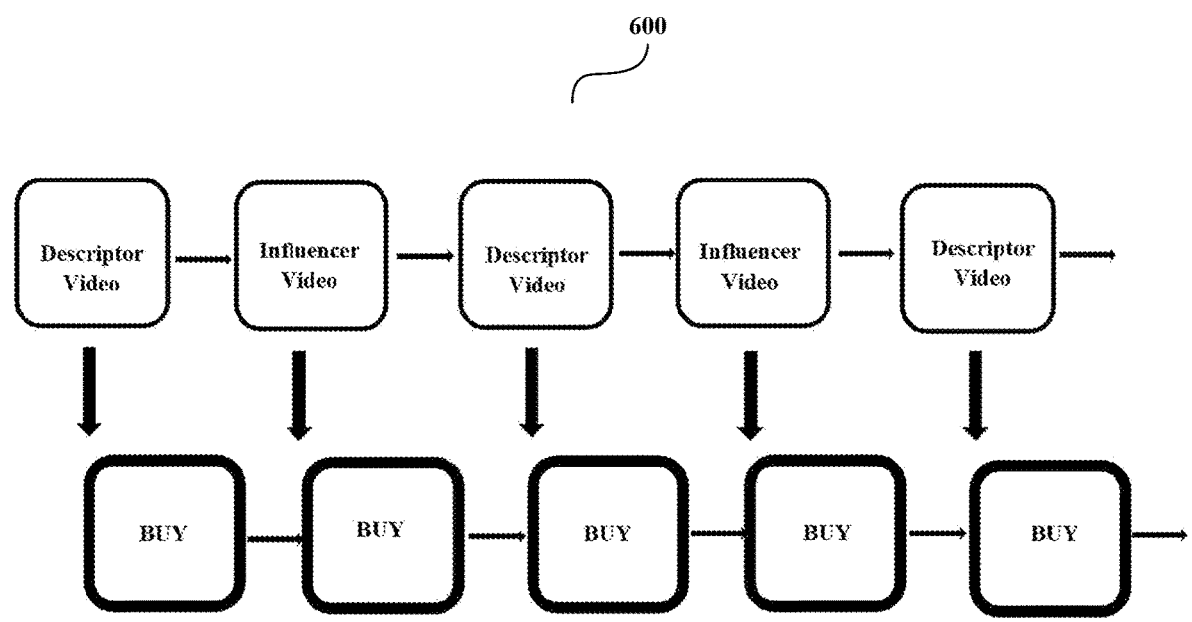
FIG. 6 depicts an exemplary shopping channel according to an exemplary embodiment of the invention.

FIG. 6 depicts an exemplary configuration of a shopping channel 600 wherein buckets of different categories may be provided and the content hooks may be displayed to a user 104. The user 104 can click on desired content hook and view related descriptor videos and the influencer videos. Each descriptor video and the influencer videos may be linked to an e-commerce portal that provides the user 104 with a choice of purchasing the products.

Figure 7:
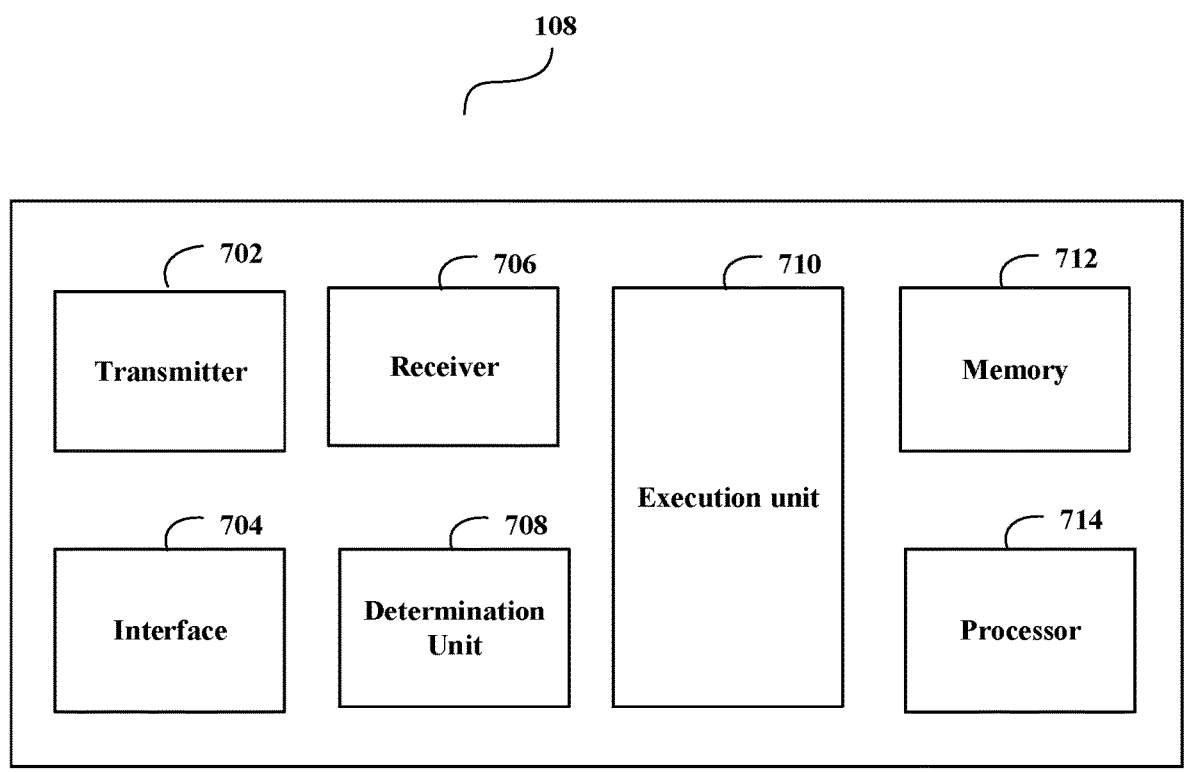
FIG. 7 depicts block diagram of different components of a platform according to an exemplary embodiment of the invention.

FIG. 7 depicts a block diagram of different components of a platform 108 according to an exemplary embodiment of the invention. The platform 108 may comprise of, but is not limited to, a transmitter 702, an interface 704, a receiver 706, a determination unit 708, an execution unit 710, a memory 712, and/or a processor 714. The receiver 706 may be adapted to receive a request for a video and one or more preferences from a user terminal 102. The receiver 706 may communicate the request and preferences to the determination unit 708. The determination unit 708 may determine one or more content hooks based on the one or more preferences of a user 104 received from the user terminal 102 and behavior of the user 104 as described above. The determination unit 708 may also be adapted to place the one or more content hooks in a video at one or more intervals as explained above. The determination unit 708 may communicate the video with the content hooks to the execution unit 710. The execution unit 710 may be adapted to enable the one or more content hooks with an executable link. The execution unit 710 may also be adapted to direct the executable link to an advertisement playlist. The advertisement playlist comprises one or more descriptor videos and influencer videos curated for the user 104 based on one or more parameters which has been explained in details above. The interface 704 of the platform 108 may be adapted to allow the content providers and advertisers to upload descriptor videos as well as influencer videos for the user 104. The memory 712 may be adapted to store the preferences and the behavior of the user 104.

Moreover, the transmitter 702, the interface 704, the receiver 706, the determination unit 708, the execution unit 710, the memory 712 and/or may be communicably coupled with the processor 714. The different units described herein are exemplary. The invention may be performed using one or more units. For example, the tasks executed by the transmitter 702, the interface 704, the receiver 706, the determination unit 708, the execution unit 710, the memory 712 and/or the processor 714 may be performed by a single unit. Alternatively, more number of units as described herein may be used to perform the present invention.

Figure 8:
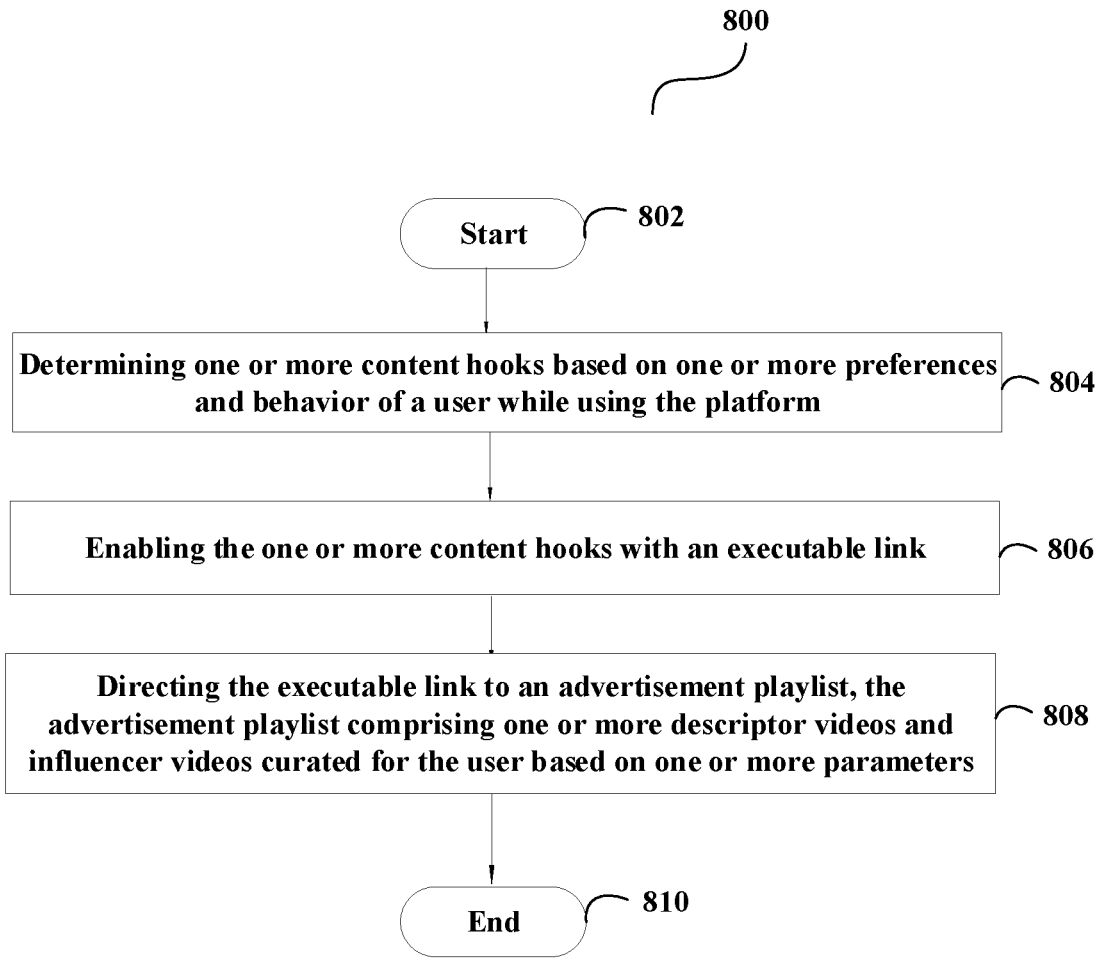
FIG. 8 depicts an exemplary flowchart illustrating a method to perform the invention according to an exemplary embodiment of the invention.

FIG. 8 depicts a flowchart outlining the features of the invention in an exemplary embodiment of the invention. The method flowchart 800 describes a method being for targeted brand campaigning using a platform 108. The method flowchart 800 starts at step 802.

At step 804, a platform 108 may determine one or more content hooks based on one or more preferences and behavior of a user 104 while using the platform 108. This has been discussed above in greater details.

At step 806, the platform 108 may enable the one or more content hooks with an executable link. This has been discussed above in greater details.

At step 808, the platform 108 may direct the executable link to an advertisement playlist. Also, the advertisement playlist may comprise one or more descriptor videos and influencer videos curated for the user 104 based on one or more parameters. This has been discussed above in greater details. Then, the method flowchart 800 may end at 810.

The present invention is applicable to various types of content such as, but not limited to, audio-video content fi, electronic media, advertisements in the streaming content and any such field/industry that is obvious to a person skilled in the art.

The present invention is applicable in any industry/field that is well known in the art and where a platform is utilized. The embodiments of the invention discussed herein are exemplary and various modification and alterations to a person skilled in the art are within the scope of the invention.

The present invention encompasses the user terminal 102 to employ a transmitting unit, a receiver, an interface, a memory and/or a processor to perform several functions and/or operations as discussed in the specification. The transmitting unit of the user terminal 102 may be configured to transmit a request comprising one or more user preferences to a platform 108. The platform 108 may be configured to determine one or more content hooks based on the one or more preferences and behavior of a user 104 while using the platform 108. This has been discussed in details above. The platform 108 may further be configured to enable the one or more content hooks with an executable link and direct the executable link to an advertisement playlist. The advertisement playlist comprises one or more descriptor videos and influencer videos curated for the user 104 based on one or more parameters. The receiver of the user terminal 102 may be configured to receive the advertisement playlist from the platform 108. The interface of the user terminal 102 may be configured to receive inputs from the user 104 and may also display the content hooks and/or the advertisement playlist for the user 104. The memory of the user terminal 102 may be configured to store content hooks and the advertisement playlist. The processor of the user terminal 102 may be communicably coupled with the transmitting unit, the receiver, the interface, and/or the memory.

In one embodiment of the invention, the invention can be operated using the one or more computer readable devices. The one or more computer readable devices can be associated with a platform 108. A computer readable medium comprises one or more processors and a memory coupled to the one or more processors, the memory stores instructions executed by the one or more processors. The one or more processors are configured to determine one or more content hooks based on one or more preferences and behavior of a user 104 while using a platform 108. The one or more processors are further configured to enable the one or more content hooks with an executable link and direct the executable link to an advertisement playlist. Further, the advertisement playlist comprising one or more descriptor videos and influencer videos curated for the user based on one or more parameters.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for targeted brand campaigning using a platform, the method comprising:
   determining one or more content hooks based on one or more preferences and behavior of a user while using the platform;
   enabling the one or more content hooks with an executable link;
   directing the executable link to an advertisement playlist, the advertisement playlist comprising one or more descriptor videos and influencer videos curated for the user based on one or more parameters.

2. The method of claim 1, wherein the platform is configured to receive the one or more preferences from a user terminal of the user.

3. The method as claimed in claim 2, wherein the behavior of the user further comprises using one or more gestures while interacting with the one or more content hooks, the descriptor videos and/or the influencer videos on the user terminal.

4. The method as claimed in claim 2, wherein the platform transmits the advertisement playlist comprising the descriptor videos and the influencer videos to the user terminal when the user interacts with the executable link provided in the one or more content hooks.

5. The method as claimed in claim 1, wherein each of the one or more content hooks represent a video providing a factual news about a product or a service.

6. The method as claimed in 1, wherein the platform determines the descriptor videos and the influencer videos on executing the executable link.

7. The method as claimed in claim 1, wherein the one or more descriptor videos and the influencer videos determined by the platform as arranged differently for different users based on the one or more preferences and the behavior of each user or on a probability that the descriptor videos and the influencer videos are useful for the user as determined by the one or more parameters and AI/ML techniques.

8. The method as claimed in claim 1, wherein the one or more content hooks, the descriptor videos and the influencer videos are associated with at least one hash tag.

9. The method as claimed in claim 1, wherein the one or more influencer videos comprise a review of a product or service and/or a description of the product or the service by an expert, wherein the expert records his/her opinion or a comment on the product or service.

10. The method as claimed in claim 1, wherein the each of the descriptor video and/or the influencer video direct the user to an interactive e-commerce portal or any other landing page for buying the product.

11. The method as claimed in claim 1, wherein the platform enables a content provider or an advertiser or a brand manager to upload a descriptor video of a product and enables an influencer to upload an influencer video of the product using respective user credentials.

12. The method as claimed in claim 1, wherein the platform enables a content provider or an advertiser to select one or more hash tags from a content repository.

13. The method as claimed in claim 1, wherein the content hooks and/or the advertisement playlist is determined based on the one or more preferences for a new user.

14. A platform for targeted brand campaigning, the platform comprising:
   a determination unit configured to determine one or more content hooks based on one or more preferences and behavior of a user while using the platform; and
   an execution unit configured to
   enable the one or more content hooks with an executable link; and
   direct the executable link to an advertisement playlist, the advertisement playlist comprising one or more descriptor videos and influencer videos curated for the user based on one or more parameters.

15. The platform as claimed in claim 14, wherein the platform is configured to receive the one or more preferences from a user terminal of the user.

16. The platform as claimed in claim 15, wherein the behavior of the user further comprises using one or more gestures while interacting with the one or more content hooks, the descriptor videos and/or the influencer videos on the user terminal.

17. The platform as claimed in claim 15, wherein the platform transmits the advertisement playlist comprising the descriptor videos and the influencer videos to the user terminal when the user interacts with the executable link provided in the one or more content hooks.

18. The platform as claimed in claim 14, wherein each of the one or more content hooks represent a video providing a factual news about a product or a service.

19. The platform as claimed in claim 14, wherein the platform determines the descriptor videos and the influencer videos on executing the executable link.

20. The platform as claimed in claim 14, wherein the one or more descriptor videos and the influencer videos determined by the platform as arranged differently for different users based on the preferences and the behavior of each user or on a probability that the descriptor videos and the influencer videos are useful for the user as determined by the one or more parameters and AI/ML techniques.

21. The platform as claimed in claim 14, wherein the one or more content hooks, the descriptor videos and the influencer videos are associated with at least one hash tag.

22. The platform as claimed in claim 14, wherein the one or more influencer videos comprise a review of a product or service and description of the product or the service by an expert, wherein the expert records his/her opinion or a comment on the product or service.

23. The platform as claimed in claim 14, wherein the each of the descriptor video and/or the influencer video direct the user to an interactive e-commerce portal or any other landing page for buying the product.

24. The platform as claimed in claim 14, wherein the platform enables a content provider or an advertiser or a brand manager to upload a descriptor video of a product and enables an influencer to upload an influencer video of the product using respective user credentials.

25. The platform as claimed in claim 14, wherein the platform enables a content provider or an advertiser to select one or more hash tags from a content repository.

26. The platform as claimed in claim 14, wherein the content hooks and/or the advertisement playlist is determined based on the one or more preferences for a new user.

27. A user terminal for receiving targeted brand campaigning, the user terminal comprising:
   a transmitting unit configured to transmit a request comprising one or more user preferences to a platform, wherein the platform is configured to:
   determine one or more content hooks based on the one or more preferences and behavior of a user while using a platform;
   enable the one or more content hooks with an executable link; and
   direct the executable link to an advertisement playlist, the advertisement playlist comprising one or more descriptor videos and influencer videos curated for the user based on one or more parameters; and
   a receiver configured to receive an advertisement playlist from the platform.

28. The user terminal as claimed in claim 27, wherein the one or more content hooks, the descriptor videos and the influencer videos are associated with at least one hash tag.

29. A non-transitory computer readable medium storing instructions to be executed by one or more processors to configure the one or more processors to:
   determine one or more content hooks based on one or more preferences and behavior of a user while using a platform;
   enable the one or more content hooks with an executable link;
   direct the executable link to an advertisement playlist, the advertisement playlist comprising one or more descriptor videos and influencer videos curated for the user based on one or more parameters.

* * * * *